United States Patent [19]
Lapore et al.

[11] 3,806,600
[45] Apr. 23, 1974

[54] AMMONIUM AND POTASSIUM ISOBUTYRATES AS PATHOGEN GROWTH INHIBITORS AND GROWTH STIMULATORS

[75] Inventors: Paul D. Lapore, Glenelg; Peter A. Hahn, Ellicott City, both of Md.

[73] Assignee: W. R. Grace & Co., Clarksville, Md.

[22] Filed: Nov. 20, 1972

[21] Appl. No.: 308,030

Related U.S. Application Data

[63] Continuation-in-part of Ser. No. 76,224, Sept. 28, 1970, which is a continuation-in-part of Ser. No. 1,311, Jan. 7, 1970, abandoned.

[52] U.S. Cl.................. 424/317, 426/227, 426/335
[51] Int. Cl............................................. A23k 3/02
[58] Field of Search............. 99/8 E, 8 R, 8 D, 156, 99/2 R, 155, 154, 225, 2 ND; 424/317; 260/526; 252/407; 426/227, 310, 335

[56] References Cited
UNITED STATES PATENTS

| 1,589,866 | 6/1926 | Seigler et al. | 424/317 |
| 3,279,982 | 10/1966 | Brooks et al. | 99/224 |

OTHER PUBLICATIONS

H. D. Young, Chemical Abstracts, Vol. 24, 1930, p. 3595.

Primary Examiner—Norman Yudkoff
Assistant Examiner—Curtis C. Ribando
Attorney, Agent, or Firm—Charles L. Harness

[57] ABSTRACT

This invention is the use of ammonium and potassium isobutyrates as a means for inhibiting the growth of plant and animal pathogenic and non-pathogenic organisms. Another effect of this invention is the improvement in the rate of weight gain in animals which have been treated with these isobutyrates.

15 Claims, No Drawings

AMMONIUM AND POTASSIUM ISOBUTYRATES AS PATHOGEN GROWTH INHIBITORS AND GROWTH STIMULATORS

This application is a continuation-in-part of U.S. Ser. No. 76,224, filed Sept. 28, 1970, which is in turn a continuation-in-part of U.S. Ser. No. 1311, filed Jan. 7, 1970, now abandoned.

As is well-known in the agricultural industry, plant and animal pathogens, hereinafter also referred to as microorganisms, are a serious problem and cause of grave economic consequences. For purposes of this specification and claims, plant and animal pathogens include molds, yeasts, and bacteria. Such pathogens include *Sclerotium rolfsii, Rhizoctonia solani, Fusarium, Pythium, Penicillium, Aspergillus* species, *Candida albicans, Salmonella* species, and *Escherichia coli*.

Some of the microorganisms, which are the major cause of spoilage in animal feedstuffs (which includes mixed feeds, silage, fermented grains and plants), are molds such as *Sclerotium rolfsii, Rhizoctonia solani, Fusarium, Pythium, Penicillium,* and *Aspergillus* species.

Attempts for controlling mold growth have included the use of sulphur, copper compounds, mercury compounds, various carbonates, glyoxalidine, quinone, Captan, guanidine and most recently propionic acid and its salts. Of these, the calcium salt ($Ca(C_3H_5O_2)_2$) of propionic acid has been most widely used.

Some plant damage known as "seedling blight" is caused by pathogens which are carried on the seed and attack the seedling throughout its growth. Seed rot occurs due to the pathogens which are present in the soil surrounding the seed and which are powerful enough to destroy the seed, even before it begins to germinate. If the seeds do manage to germinate and grow to maturity, there is still a serious problem of further mold growth during storage of the feedstuffs. The mold inhibitors used in the past have had partial success, but there still remains a severe loss of feedstuffs due to a growth of molds.

As is also well-known in the agricultural industry various animals suffer malfunctioning of the digestive tract with resulting diarrhea. This, of course, leads to poor performance as pertains to weight gain and frequently even death of the animal. A general term applied to this condition is "scours." It is uncertain which pathogen is responsible for this condition although *Escherichia coli* is generally found when the condition arrives. Other pathogens such as *Candida albicans* and *Salmonella* species are also present particularly in poultry diarrhea conditions. It is also well-known that in many animals diarrhea is a frequent sympton of *Candida albicans* infection. Heretofore, then, even though it has been evident that the effects of certain pathogenic organisms infections were hindering the growth of animals, there has been little success in curing the problem.

As is evident, then, pathogenic organisms which cause mold growth on seeds and animal feedstuffs and which adversely affect the weight gain of animals are of serious economic consequences to the agricultural industry.

As is also known, mycotoxins, i.e. poisons produced by molds and fungi which remain in a feedstuff, are harmful to the animal which digests the feedstuff and may cause similar disorders as the pathogens above-stated. Mycotoxins are produced by both pathogenic organisms and organisms which themselves are not pathogenic. It is to be understood then that "pathogen" refers also to microorganisms producing mycotoxin for purposes of this specification and claims.

Accordingly, it is an object of this invention to provide a means for inhibiting the growth and proliferation of plant and animal microorganisms. More specifically, it is an object of this invention to inhibit mold growth on seeds and animal feedstuffs. It is also an object to inhibit the growth of animal pathogens which prevent normal weight gain in animals. It is, more specifically, a further object of this invention to inhibit the growth of *Sclerotium rolfsii, Rhizoctonia solani, Fusarium, Pythium, Penicillium, Aspergillus* species, *Candida albicans, Salmonella* species, and *Escherichia coli*. It is still further object to increase the rate of weight gain in animals. Other objectives of this invention will become apparent to those skilled in the art from the material herein disclosed. It is also an object to reduce any effect which mycotoxins may have upon animals.

We have found that the ammonium and potassium salts of isobutyric acid in relatively small quantities inhibit the growth of such above-noted pathogens. We have further found that when these salts are applied to seeds or feedstuffs the growth of plant pathogens is inhibited. We have also found that when these salts are applied to animal pathogens such as *Candida albicans, Salmonella species,* and *Escherichia coli,* their growth is inhibited. We have further found that when small quantities of these salts are added to an animal's feed ration as an additive, the animal shows a significant rate of weight gain superior to that of animals not receiving the additive.

More specifically, as is well-known in the art, in order for mold to grow it is necessary that the substrate contain at least 12 percent moisture. It has been found that when ammonium or potassium isobutyrate is applied to such substances, the growth of molds is inhibited. In fact, these isobutyrates are effective on substrates of even higher moisture content, e.g., 30 percent and more.

It is known that isobutyric acid per se is an effective fungicide. However, it suffers from three very practical drawbacks. Firstly, it smells so bad that farmers and animal feed personnel resist working with it. Secondly, it is corrosive not only to apparatus used to apply it, but also to the skin of human beings and animals. Thirdly, in many cases animals are reluctant to eat grain that has been treated with it. In the latter regard, we speculate that the unpalatability stems from odor. The odor and corrosivity is substantially reduced by neutralizing the free isobutyric acid to provide a salt, e.g., the ammonium salt. When this form is used to treat the grain, it is much more palatable to the animal than the isobutyric-acid treated form. In typical tests, where both types of feed are offered to animals free style ("cafeteria style"), they prefer the ammonium isobutyrate-treated feed about 2.7:1 over the isobutyric acid treated feed. Complete data are given in the tables following, which give results of feeding these two feeds to a group of six lambs.

TABLE I

RATIONS' COMPOSITION FOR PALATABILITY STUDY OF AIB* VS. ISOBUTYRIC ACID

| Ingredient | Ration A % | Ration B % |
|---|---|---|
| Alfalfa Hay | 30 | 30 |
| Ground Corn | 67.4 | 67.4 |
| Trace Mineralized Salt | 0.3 | 0.3 |
| AIB* | 2.0 | — |
| Isobutyric Acid | — | 1.68 |
| Urea | — | 0.71 |
| Limestone | 0.3 | 0.3 |
| | 100.0 | 99.4 |

All rations contain 12% protein and 65% concentrate

*Ammonium isobutyrate

Comment: 1.68 percent isobutyric acid is the mole equivalent of 2.0 percent ammonium isobutyrate. Urea added in Ration B equivalent to nitrogen added in ammonium isobutyrate in Ration A.

TABLE II

PALATABILITY STUDY OF AIB* VS. ISOBUTYRIC ACID IN A GROUP OF SIX LAMBS

| Day | Daily Feed Intake (lbs/head) AIB* Diet | Isobutyric Diet |
|---|---|---|
| 1 | 2.4 | 0.9 |
| 2 | 2.5 | 0.8 |
| 3 | 2.1 | 0.9 |
| 4 | 1.9 | 0.4 |
| 5 | 1.8 | 0.9 |
| 6 | 1.6 | 1.0 |
| 7 | 1.1 | 1.8 |
| 8 | 2.2 | 0.3 |
| 9 | 1.5 | 1.2 |
| 10 | 1.0 | 0.5 |
| 11 | 1.8 | 0.1 |
| 12 | 2.6 | 0.2 |
| 13 | 1.4 | 0.7 |
| 14 | 2.0 | 0.4 |
| Total | 26.5 | 10.1 |
| Average | 1.9 | 0.7 |
| AIB* Superiority ratio, 1.9/0.7 = 2.7 | | |

*Ammonium isobutyrate

It is only when the animal is deprived of other feeds that it can be forced to eat isobutyric acid-treated feed exclusively.

Despite our success with ammonium isobutyrate, it appears that the effect of neutralizing isobutyric acid to form other salts is unpredictable. In all instances, odor is effectively reduced. On the other hand, in the general case so is fungicidal activity. Of all the salts that we have tested, only the ammonium and potassium salts are effective fungicides. Some curious failures include sodium, calcium, and magnesium. These could be made to demonstrate activity only at greatly elevated levels of application, which would make them commercially useless. In several cases heavy metal isobutyrate salts were found effective as fungicides, e.g., copper and nickel isobutyrates; however, owing to this toxicity, these cannot be applied to feeds. We have concluded, therefore, that the cation of the salt is highly critical as regards activity and commercial suitability.

The amount of ammonium or potassium isobutyrate required to inhibit mold will vary to some extent, depending on the nature of the substrate. In general, at least 0.25 weight percent of isobutyrate is required. On the other hand, effective mold inhibition is attained at 1-2 percent levels, and amounts greater than 2 percent, although useful and operable, do not generally give results superior to the 1 or 2 percent levels and are therefore not preferred. A generally preferred range is 0.5-1 percent.

We have further found that a combination of ammonium (or potassium) isobutyrate, and a second component which can be either acetic or citric acid or sodium lauryl sulfate, provides a synergistic effect when used to control mold growth. As the following examples will show, neither a 0.5 percent (based on the weight of the substrate plus isobutyrate) level of ammonium isobutyrate nor a 0.4 percent (based on the weight of the substrate plus additive) level of citric acid (additive) was effective in controlling the growth of molds on seeds and feedstuffs. However, a combination of 0.5 percent ammonium isobutyrate and 0.1 percent citric acid or acetic acid was effective in controlling mold growth. Generally the additive is at least 0.1–0.4 weight percent, preferably 0.2–0.4 weight percent, of the total weight of the mold growth inhibitor plus substrate.

More specifically, when we use the combinations above mentioned we prefer to use a ratio of: citric or acetic acid: ammonium isobutyrate in the range of 0.133–0.2:1 or sodium lauryl sulfate: ammonium isobutyrate of 0.1–0.4:1. Although the above ratios are preferable, operable ratios are as follows: acetic or citric acid: ammonium isobutyrate, 0.133–1.67:1 and sodium lauryl sulfate: ammonium isobutyrate, 0.1–1.67:1.

The combination described above is added to the site which is to be protected by either dusting, applying a slurry, or spraying of the feedstuffs, in a ratio of mold inhibitor to feedstuff of 0.0045–0.20:1 and more preferably 0.006–0.012:1.

We have found that in addition to their effect on plant pathogens the isobutyrates are effective against animal pathogens. This is particularly surprising in view of the fact that it has generally been believed that butyric acid was ineffective against animal pathogens, particularly *Candida albicans* (U.S. Pat. No. 2,841,526).

However, we have found that when a nutrient broth medium comprising at least 0.4 percent of ammonium or potassium isobutyrate is inoculated with an animal pathogen (e.g. *Salmonella* species, and *Escherichia coli*), the growth of the pathogens is effectively inhibited. We have further found that the synergistic effect obtained when the combination of the aforesaid ammonium or potassium isobutyrate and an additive of either acetic or citric acid or sodium lauryl sulfate is applied against plant pathogens also applies to the above listed animal pathogens. Although we prefer that the acetic acid, citric acid or sodium lauryl sulfate be 0.2–0.4 percent by weight of the feedstuff plus the isobutyrate plus additive and the isobutyrate be 0.25–2.0 percent by weight of the feedstuff plus the isobutyrate plus additive, effective percentages are 0.1–0.4 percent by weight additive and 0.25–4.0 percent by weight of the isobutyrate.

When administering the pathogen growth inhibitor to animals we have found several methods of introduction to the animal are satisfactory. In one convenient method the pathogen growth inhibitor is introduced into the animal as a feed supplement by spraying the pathogen growth inhibitor onto the feedstuff, so that 0.25–2.0 percent of the animal's daily diet consists of the pathogen growth inhibitor. Of course, the percentage of pathogen growth inhibitor in the daily feed will vary with the particular animal. For example, 0.5 to 1 percent of the daily diet is effective for chickens.

We have also found that for suckling pigs an application bottle with a "push plunger" arrangement wherein a specific amount of pathogen growth inhibitor is orally administered, is very convenient. We have found that to prepare the pathogen growth inhibitor it is most convenient to prepare a water solution, wherein 4 to 8 percent by weight of pathogen growth inhibitor based on the total weight of pathogen growth inhibitor plus solvent.

We have found further that when a salt of isobutyric acid, particularly the ammonium salt is supplied as a poultry feed additive there is a significant increase in the rate of weight gain shown by the animal. Although we prefer that 0.4 – 0.6 percent by weight of the total diet be ammonium or potassium isobutyrate, 0.25 – 2.00 percent by weight of the total diet produces an increased rate of weight gain.

We have found, therefore, that small quantities of ammonium or potassium salts of isobutyric acid are effective in inhibiting the growth of pathogenic organisms. Additionally, when animals are fed an additive containing one of these salts there is a significant weight gain, and although we are uncertain as to why this is so, it is quite possible that the weight gain is a result of the salt inhibiting the proliferation of pathogens.

It will be obvious that in the general case, a feedstuff treated for mold control by the use of ammonium or potassium isobutyrate will still contain ammonium or potassium isobutyrate when fed to animals; such isobutyrate will assist in control of pathogens in the animals digestive tract, as shown in the various examples below.

The following examples will aid in explaining the present invention but are intended to be illustrative only, and not limiting.

EXAMPLE 1

An agar medium containing 0.25 weight percent ammonium isobutyrate was poured into a petri dish. A well-known plant pathogen, *Sclerotium rolfsii*, was introduced to the petri dish. After a two-week period, it was found that mold growth had not occurred. At the same time, *Schlerotium rolfsii* which was applied to an agar medium in a petri dish without the ammonium salt showed substantial growth of mold.

EXAMPLE 2

Example 1 was repeated except that the plant pathogen was *Rhizoctonia solani*. Results identical to Example 1 were obtained.

EXAMPLES 3–5

An agar medium containing 1.5 weight percent ammonium isobutyrate was prepared and poured onto seven petri plates. Onto each of the first five plates one of five unidentified species of *Fusarium* was introduced; onto the sixth, *Fusarium oxysporium* was introduced; and a *Pythium* species was introduced onto the seventh plate. In each case, after a two-week period there was no evidence of the growth of mold. When the same pathogens were applied to an agar medium which did not contain the ammonium isobutyrate there was substantial growth of mold.

EXAMPLE 6

Various substrates with a moisture content of 30 percent were exposed to ammonium isobutyrate. It was found that when 70-g aliquots of ground corn, cracked corn, whole corn, and cracked milo were treated with 30 ml. water containing 0.75–1.5 g. ammonium isobutyrate, mold growth was effectively inhibited. When a like substrate was sprayed with an equal amount of calcium propionate the mold continued to grow. 2.0 weight percent of calcium propionate was necessary to effectively inhibit mold growth. It was also found that about 1.0 weight percent of ammonium isobutyrate was effective in controlling mold growth on peanut meal; whereas at least 2.0 weight percent calcium propionate was needed to inhibit the same growth. In addition, 0.5–1.25 weight percent of ammonium isobutyrate was effective in controlling mold growth on cottonseed meal and wheat; however, at least 2.0 weight percent calcium propionate was needed to accomplish the same amount of control. The results are summarized in the Table listed below:

TABLE III

| Substrate (30% moisture) | Typical Effective level $NH_4$ Isobutyrate | Typical Effective level Calcium Propionate |
|---|---|---|
| Ground Corn | 0.75–1.5% | 2.0% |
| Cracked Corn | 0.75–1.5% | 2.0% |
| Whole Corn | 0.75–1.5% | 2.0% |
| Cracked Milo | 0.75–1.5% | 2.0% |
| Peanut Meal | 1.00% | 2.0% |
| Cottonseed Meal | 0.5–1.25% | 2.0% |
| Wheat | 0.5–1.25% | 2.0% |

EXAMPLE 7

The substrate was 70 g. dried corn. To this was applied 1.5 g of potassium isobutyrate dissolved in 30 ml. water. Mold growth was effectively inhibited. When a like sample of ground corn was not sprayed with the potassium isobutyrate, there was an abundance of mold growth after a two-week period.

EXAMPLE 8

Eight thousand pounds of sorghum (Sorghum vulgare) was treated with 0.75 percent by weight ammonium isobutyrate as a dry powder (60 lbs.) to provide a homogeneous mixture and stored as silage under airtight conditions for a period of one month, at the end of which time it was inspected for mold; none was found. A like sample was also stored as silage for one month but was not treated with ammonium isobutyrate. After this period it exhibited substantial mold growth.

EXAMPLE 9

Various substrates with a moisture content of 30–40 percent were exposed to ammonium isobutyrate and citric acid. It was found that when 70 gm. aliquots of ground corn, cracked corn, whole corn, cracked milo, peanut meal, cottonseed meal, and wheat were treated with 30 ml. water containing at least 0.5 gm. ammonium isobutyrate and 0.1 gm. citric acid, mold growth was effectively inhibited. The complete results are given in Table IV for cracked corn. Similar results were obtained with ground corn, whole corn, cracked milo, peanut meal, cottonseed meal, wheat, silage, wet hay, and haylage.

TABLE IV

Ammonium Isobutyrate-Citric Acid as Mold Growth Inhibitor

| %NH₄-isobutyrate | Citric Acid | Mold Growth in 30–40% Moisture Cracked Corn | | | |
|---|---|---|---|---|---|
| | | 4 day | 8 day | 11 day | 15 day |
| none | none | + | + | + | + |
| none | 0.1 | + | + | + | + |
| none | 0.2 | + | + | + | + |
| none | 0.4 | + | + | + | + |
| 0.25 | none | trace | + | + | + |
| 0.25 | 0.1 | trace | + | + | + |
| 0.25 | 0.2 | − | trace | + | + |
| 0.25 | 0.4 | − | − | trace | + |
| 0.5 | none | − | − | trace | + |
| 0.5 | 0.1 | − | − | − | − |
| 0.5 | 0.2 | − | − | − | − |
| 0.5 | 0.4 | − | − | − | − |
| 0.75 | none | − | − | − | + |
| 0.75 | 0.1 | − | − | − | − |
| 0.75 | 0.2 | − | − | − | − |
| 0.75 | 0.4 | − | − | − | − |

Note: "+" means substantial mold; "−" means no detectable mold.

EXAMPLE 10

Example 9 was repeated substituting potassium isobutyrate for ammonium isobutyrate. Results similar to those of Example 9 were obtained.

EXAMPLE 11

Various substrates with a moisture content of 30 percent were exposed to ammonium isobutyrate and sodium lauryl sulfate. It was found that when 70 gm. aliquots of ground corn, cracked corn, whole corn, cracked milo, peanut meal, cottonseed meal, and wheat were treated with 30 ml. water containing at least 0.5 gm. ammonium isobutyrate and 0.4 gm. sodium lauryl sulfate, mold growth was effectively inhibited. The complete results are given in Table IV for the cracked corn samples. Similar results were attained with ground corn, whole corn, cracked milo, peanut meal, cottonseed meal and wheat.

TABLE V

Ammonium Isobutyrate-Sodium Lauryl Sulfate As Mold Growth Inhibitor

| % NH₄-isobutyrate | % Na lauryl sulfate | Mold Growth in 30–40% Moisture Cracked Corn | | | |
|---|---|---|---|---|---|
| | | 4 day | 8 day | 11 day | 15 day |
| none | none | + | + | + | + |
| none | 0.1 | + | + | + | + |
| none | 0.2 | + | + | + | + |
| none | 0.4 | + | + | + | + |
| 0.5 | none | − | trace | + | + |
| 0.5 | 0.1 | + | + | + | + |
| 0.5 | 0.2 | − | − | trace | + |
| 0.5 | 0.4 | − | − | − | − |
| 1.0 | none | − | − | − | − |
| 1.0 | 0.1 | − | − | − | − |
| 1.0 | 0.2 | − | − | − | − |
| 1.0 | 0.4 | − | − | − | − |

Note: "+" means substantial mold; "−" means no detectable mold.

EXAMPLE 12

Example 12 followed the procedure of Example 11, but the potassium salt of isobutyric acid was substituted for the ammonium isobutyrate with similar favorable results.

EXAMPLE 13

An agar medium containing 0.25 weight percent ammonium isobutyrate and 0.2 weight percent citric acid was poured into a petri dish. *Sclerotium rolfsii* was introduced to the petri dish. After a two-week period it was found that mold growth had not occurred. At the same time *Sclerotium rolfsii* which was applied to an agar medium in a petri plate without the ammonium isobutyrate and citric acid showed substantial growth of mold.

EXAMPLE 14

Example 13 was repeated except that the plant pathogen was *Rhizoctonia solani*. Results substantially identical to Example 13 were obtained.

EXAMPLE 15

An agar medium containing 0.5 weight percent ammonium isobutyrate and 0.2 weight percent sodium lauryl sulfate was poured into a petri dish. *Sclerotium rolfsii* was introduced to the petri dish. After a two-week period it was found that mold growth had not occurred. At the same time *Sclerotium rolfsii* which was applied to an agar medium in a petri plate without the ammonium isobutyrate and sodium lauryl sulfate showed substantial growth of mold.

EXAMPLE 16

Example 15 was repeated except that the plant pathogen was *Rhizoctonia solani*. Results substantially identical to Example 15 were obtained.

EXAMPLES 17 – 19

Example 13 was repeated substituting five unidentified species of *Fusarium* (Example 17), *Fusarium oxysporium* (Example 18), and a *Pythium* species (Example 19). In each example there was no evidence of mold growth after a two-week period.

EXAMPLES 20 – 22

Example 15 was repeated substituting five unidentified species of Fusarium (Example 20), *Fusarium oxysporium* (Example 21), and a *Pythium* species (Example 22). In each case there was no evidence of mold growth after a two-week period.

EXAMPLE 23

Eight thousand pounds of sorghum (Sorghum vulgare) was treated with 0.25 percent by weight ammonium isobutyrate (20 lbs.) and 0.20 percent by weight citric acid (16 lbs.) as a dry composition to provide a homogeneous mixture and stored as silage under airtight conditions for a period of one month, at the end of which time it was inspected for mold; none was found. A like sample was treated with 0.50 percent by weight ammonium isobutyrate (40 lbs.) and 0.20 percent by weight sodium lauryl sulfate (16 lbs.), as a dry composition to provide a homogeneous mixture and it, too, was stored as silage under air-tight conditions for a period of one month, at the end of which time it was inspected for mold; none was found.

EXAMPLE 24

An agar medium containing 4.0 percent by weight ammonium isobutyrate was poured into a petri dish. *Escherichia coli*, a well-known pathogen which was isolated from a "scouring" pig was introduced to the petri dish. After a two-week period it was found that growth of the pathogen had not occurred. At the same time *Escherichia coli* which was applied to an agar medium in a petri dish without the ammonium salt showed substantial growth of mold.

EXAMPLE 25

Example 24 was repeated, except that potassium isobutyrate was substituted for the ammonium isobutyrate. Similar results were obtained.

EXAMPLES 26 – 28

Example 24 was repeated except that three species of Salmonella, *S. typhimurium*, *S. gallinarum*, and *S. pullorum*, were substituted for *Escherichia coli* in Examples 26, 27, and 28 respectively. None of the petri dishes showed any signs of pathogenic growth although control samples prepared in the same manner contained substantial pathogenic growth.

EXAMPLE 29

Nutrient broth mediums containing varying weight percentages of ammonium isobutyrate and citric acid as shown in Table IV were inoculated with three species of Salmonella, *S. typhimurium*, *S. gallinarum*, and *S. pullorum*. As Table V shows, in each instance the growth of *Salmonella* was inhibited when 2.0 weight percent ammonium isobutyrate and 0.1 weight percent citric acid were present in the agar.

TABLE VI

Effect of Ammonium Isobutyrate ("AIB") and Citric Acid On Salmonella Species (Salmonella typhimurium)
% Citric Acid

| % AIB | 0 | 0.0125 | 0.025 | 0.05 | 0.1 | 0.2 | 0.4 |
|---|---|---|---|---|---|---|---|
| 0 | + | + | + | + | + | + | – |
| 0.125 | + | + | + | + | + | + | – |
| 0.25 | + | + | + | + | + | – | – |
| 0.5 | + | + | + | + | + | – | – |
| 1.0 | + | + | + | + | + | – | – |
| 2.0 | + | + | + | + | – | – | – |

TABLE VI-Continued

Effect of Ammonium Isobutyrate ("AIB") and Citric Acid On Salmonella Species (Salmonella typhimurium)
% Citric Acid

| % AIB | 0 | 0.0125 | 0.025 | 0.05 | 0.1 | 0.2 | 0.4 |
|---|---|---|---|---|---|---|---|
| 4.0 | – | – | – | – | – | – | – |

(Salmonella gallinarum)
% Citric Acid

| % AIB | 0 | 0.125 | 0.025 | 0.05 | 0.1 | 0.2 | 0.4 |
|---|---|---|---|---|---|---|---|
| 0 | + | + | + | + | + | + | – |
| 0.125 | + | + | + | + | + | + | – |
| 0.25 | + | + | + | + | + | – | – |
| 0.5 | + | + | + | + | + | – | – |
| 1.0 | + | + | + | + | + | – | – |
| 2.0 | + | + | + | + | – | – | – |
| 4.0 | – | – | – | – | – | – | – |

(Salmonella pullorum)
% Citric Acid

| % AIB | 0 | 0.125 | 0.025 | 0.05 | 0.1 | 0.2 | 0.4 |
|---|---|---|---|---|---|---|---|
| 0 | + | + | + | + | + | + | – |
| 0.125 | + | + | + | + | + | + | – |
| 0.025 | + | + | + | + | + | – | – |
| 0.5 | + | + | + | + | + | – | – |
| 1.0 | + | + | + | + | + | – | – |
| 2.0 | + | + | + | + | – | – | – |
| 4.0 | – | – | – | – | – | – | – |

Note: "+" means growth of pathogens; "–" means no growth.

EXAMPLE 30

Nutrient broth mediums containing varying weight percentages of ammonium isobutyrate and citric acid as shown in Table VII were inoculated with *Candida albicans*. As Table VII shows growth of *Candida albicans* was inhibited when 0.5 weight percent ammonium isobutyrate and 0.2 weight percent citric acid were present together (but not separately) in the medium.

TABLE VII

Inhibitory Effects Of Combinations Of Citric Acid And NH$_4$ - Isobutyrate on C. albicans*

| NH$_4$-isobutyrate (%) | % Citric Acid (%) | | | | | | |
|---|---|---|---|---|---|---|---|
| | 0.0 | 0.0125 | 0.025 | 0.05 | 0.1 | 0.2 | 0.4 |
| 0.0 | + | + | + | + | + | + | + |
| 0.125 | + | + | + | + | + | + | – |
| 0.25 | + | + | + | + | + | – | – |
| 0.5 | + | + | + | + | + | – | – |
| 1.0 | + | + | + | + | – | – | – |
| 2.0 | + | + | + | + | – | – | – |
| 4.0 | + | + | + | + | – | – | – |

*The top horizontal row represents susceptibility to citric acid alone; left vertical column represents susceptibility to NH$_4$-isobutyrate alone. Inhibitory concentration of mixture: 0.2% of citric acid plus 0.25% of NH$_4$-isobutyrate. Symbol: + = growth in tube; – = no visible growth.

EXAMPLE 31

Nutrient broth mediums containing varying weight percentages of ammonium isobutyrate and citric acid as shown in Table VIII were inoculated with *Escherichia coli* taken from a "scouring" pig. As Table VIII shows, although 0.2 weight percent citric acid and 2.0 weight percent ammonium isobutyrate were ineffective when used separately against the *Escherichia coli*, when used together the growth of *Escherichia coli* was effectively inhibited.

TABLE VIII

Inhibitory Effects Of Combinations Of Citric Acid NH$_4$ - Isobutyrate on E. coli*

| NH$_4$-isobutyrate (%) | % Citric Acid | | | | | | |
|---|---|---|---|---|---|---|---|
| | 0.0 | 0.0125 | 0.025 | 0.05 | 0.1 | 0.2 | 0.4 |
| 0.0 | + | + | + | + | + | + | − |
| 0.125 | + | + | + | + | + | + | − |
| 0.25 | + | + | + | + | + | + | − |
| 0.5 | + | + | + | + | + | + | − |
| 1.0 | + | + | + | + | + | + | − |
| 2.0 | + | + | + | + | + | − | − |
| 4.0 | − | − | − | − | − | − | − |

*The top horizontal row represents susceptibility to citric acid alone; left vertical column represents susceptibility to NH$_4$-isobutyrate alone. Inhibitory concentration mixture: 0.2% citric acid plus 2.0% NH$_4$-isobutyrate. Symbol: +=growth in tube; −=no visible growth.

EXAMPLE 32

Triplicate pens of 8 Hubbard "white mountain" cockerels were reared on a regular commercially available control diet containing 22 percent protein and 2 percent sucrose. The composition of the feed and percentage of each ingredient used were as follows:

| | |
|---|---|
| Soybean Meal | 35.00% |
| Ground Corn | 55.63% |
| Salt | 0.50% |
| Lime | 1.37% |
| Dicalcium phosphate | 2.00% |
| Fat | 4.00% |
| Vitamins and trace minerals premix* | 1.50% |

*Vitamins A, D$_2$, D$_3$, E, B$_{12}$, Riboflavin, niacin, D-pantothenic acid, Menadione sodium bisulfite, DL-Methionine, Ethoxyquin, Choline chloride.

At the same time, identical triplicate pens were used and dietary additions were made at the expense of the sucrose. One group was therefore fed a control diet, and a second group was fed substantially the same diet containing 0.1 percent ammonium isobutyrate, a third group was fed substantially the same diet containing 0.5 percent ammonium isobutyrate, and a fourth group was fed the diet containing 1.0 percent ammonium isobutyrate, and a fifth group was fed the diet containing 2.0 percent ammonium isobutyrate. The results, as seen in Table IX show that all the ammonium isobutyrate fed chickens had a better feed efficiency than the control group and the chickens receiving 0.5% ammonium isobutyrate gained the most weight.

TABLE IX

Effects of Ammonium Isobutyrate in Growing Chickens - Dose Response

| Group No. | Treatment | Gain[1] g/chick | Feed[*] Efficiency |
|---|---|---|---|
| 1 | Control | 728 | 1.55 |
| 2 | +0.1% NH$_4$ isobutyrate | 696 | 1.52 |
| 3 | +0.5% NH$_4$ isobutyrate | 734 | 1.54 |
| 4 | +1.0% NH$_4$ isobutyrate | 727 | 1.51 |
| 5 | +2.0% NH$_4$ isobutyrate | 723 | 1.54 |

[1] Total gain per chick per 4 week experimental period. Each number is the average of 24 chicks
[*] g Feed divided by g gain, average of 3 replications.

EXAMPLE 33

Two sets of triplicate pens of 8 Hubbard "white mountain" cockerels were fed the 22 percent protein-2 percent sucrose diets of Example 32. However, in the second group 0.5 percent ammonium isobutyrate was added at the expense of the sucrose. Identical conditions were maintained in the pens. As can be seen from Table X, the ammonium isobutyrate fed chickens gained more weight faster than the control chickens and after a 4-week period showed superior feed efficiencies.

TABLE X

Effects of Ammonium Isobutyrate in Growing Chickens STUDY

| Week | Gain (g)[1] | | Feed Efficiency[2] | |
|---|---|---|---|---|
| | Control | AIB[3] | Control | AIB |
| 1 | 60 | 78 | 1.33 | 1.30 |
| 2 | 204 | 227 | 1.33 | 1.34 |
| 3 | 386 | 406 | 1.48 | 1.50 |
| 4 | 583 | 667 | 1.72 | 1.56 |

[1] Cumulative total gain per chick per 4 week experimental period. Each number is the average of 24 chicks.
[2] Cumulative g feed divided by g gain, average of 3 replications.
[3] Contained 0.5% ammonium isobutyrate.

As used in this invention the ammonium and potassium isobutyrates are useful in applying to any pathogen site. The nature of the site is not critical.

When the pathogen site is a mold infectable substrate, the isobutyrate salts of this invention are particularly applicable to substrates such as animal feedstuffs and seeds. In this connection feedstuffs which include the high moisture grains are particularly suitable for treatment. Within this group is included ground corn, cracked corn, whole corn, milo, peanut meal, cottonseed meal, wheat, silage, haylage, and wet hay. Mixed feeds such as chickenfeed are also suitable for treatment. The substrate may be one intended for eventual human consumption, e.g., cocoa beans. Materials comprising vegetable fibers are also suitable substrates for treatment. Examples are bagasse, cotton, linen, and the like. The mold infectable substrate is not critical, and in fact those substrates well known in the art as susceptible to mold are those intended for treatment in this invention.

What is claimed is:

1. A method of inhibiting the growth of pathogens in mold-susceptible animal feedstuffs comprising applying to the feedstuffs 0.25–2.0 percent of ammonium or potassium isobutyrate, based on the weight of the total composition; the pathogens comprising at least one selected from the group consisting of Sclerotium rolfsii, Rhizoctonia solani, Fusarium, Pythium, Penicillium, Aspergillus, Candida albicans, Salmonella species, or Escherichia coli.

2. A method according to claim 1 in which the feedstuff is selected from the group consisting of ground corn, cracked corn, whole corn, milo, peanut meal, cottonseed meal, wheat, silage, hay, and haylage.

3. A method according to claim 1 in which the isobutyrate is ammonium isobutyrate.

4. A method according to claim 1 in which the isobutyrate is potassium isobutyrate.

5. The method according to claim 1 wherein the mold growth inhibitor includes a member selected from the group consisting of acetic acid, citric acid, and sodium lauryl sulfate.

6. The method according to claim 5 wherein the weight ratio of group member to isobutyrate is in the range of 0.1 to 1.67:1.

7. The method according to claim 5 wherein the group member is at least 0.1 weight percent of the total weight of the mold growth inhibitor plus substrate.

8. The composition comprising a mold-susceptible animal feedstuff and 0.25–2.0 percent by weight of ammonium or potassium isobutyrate, wherein the animal feedstuff is one which is susceptible to at least one pathogen selected from the group consisting of *Sclerotium rolfsii, Rhizoctonia solani, Fusarium, Pythium, Penicillium, Aspergillus, Candida albicans, Salmonella species*, or *Escherichia coli*.

9. The composition according to claim 8 in which the isobutyrate is ammonium isobutyrate.

10. The composition according to claim 8 in which the isobutyrate is potassium isobutyrate.

11. The composition according to claim 8 in which the feedstuff is selected from the group consisting of ground corn, cracked corn, whole corn, milo, peanut meal, cottonseed meal, wheat, silage, hay and haylage.

12. The composition according to claim 8 wherein said composition includes an additive selected from the group consisting of citric acid, acetic acid and sodium lauryl sulfate.

13. The composition according to claim 12 wherein said additive comprises at least 0.1 weight percent based on the total weight of the additive, mold-infectable substrate and isobutyrate.

14. The composition according to claim 12 wherein the weight ratio of additive to isobutyrate is in the range of 0.1 to 1.67:1.

15. The composition according to claim 12 wherein the additive is 0.1 to 0.4 weight percent based upon the total weight of the composition.

* * * * *